(12) United States Patent  (10) Patent No.: US 8,197,629 B2
Umemoto et al.  (45) Date of Patent: Jun. 12, 2012

(54) METHOD FOR PRODUCING POLARIZING PLATE, POLARIZING PLATE, OPTICAL FILM, AND IMAGE DISPLAY

(75) Inventors: Seiji Umemoto, Ibaraki (JP); Masahiro Yaegashi, Ibaraki (JP)

(73) Assignee: Nitto Denko Corporation, Ibaraki-shi (JP)

( * ) Notice: Subject to any disclaimer, the term of this patent is extended or adjusted under 35 U.S.C. 154(b) by 324 days.

(21) Appl. No.: 12/582,023

(22) Filed: Oct. 20, 2009

(65) Prior Publication Data

US 2010/0118399 A1  May 13, 2010

(30) Foreign Application Priority Data

Nov. 12, 2008  (JP) ................................. 2008-290151

(51) Int. Cl.
   B29C 65/48  (2006.01)
   B29C 65/52  (2006.01)
   B29C 65/54  (2006.01)
   B32B 37/00  (2006.01)
   B32B 38/10  (2006.01)
(52) U.S. Cl. ........................................ 156/247; 156/254
(58) Field of Classification Search .................. 156/247, 156/250, 254
   See application file for complete search history.

(56) References Cited

U.S. PATENT DOCUMENTS

| | | | |
|---|---|---|---|
| 5,276,541 A * | 1/1994 | Terada et al. .................. | 349/190 |
| 6,512,562 B1 * | 1/2003 | Kobayashi et al. ........... | 349/122 |
| 6,582,789 B1 * | 6/2003 | Sumi ........................... | 428/40.1 |
| 6,654,085 B1 * | 11/2003 | Koike et al. ................... | 349/112 |
| 7,148,942 B2 * | 12/2006 | Kobayashi et al. ........... | 349/122 |
| 7,326,374 B2 * | 2/2008 | Hatanaka et al. ............. | 264/1.34 |
| 7,428,030 B2 * | 9/2008 | Kobayashi et al. ........... | 349/122 |
| 7,468,777 B2 * | 12/2008 | Kawamoto et al. ........... | 349/187 |
| 7,662,447 B2 * | 2/2010 | Tomoguchi et al. ........... | 428/1.5 |
| 7,704,572 B2 * | 4/2010 | Sugino et al. ................. | 428/1.54 |
| 7,709,578 B2 * | 5/2010 | Shinagawa et al. ........... | 525/194 |
| 7,847,887 B2 * | 12/2010 | Suzuki et al. .................. | 349/96 |
| 7,864,264 B2 * | 1/2011 | Sato et al. ...................... | 349/60 |
| 7,924,379 B2 * | 4/2011 | Tasaka ........................... | 349/118 |

(Continued)

FOREIGN PATENT DOCUMENTS

JP  2002-028971 A  1/2002

(Continued)

OTHER PUBLICATIONS

English Abstract of JP 2006-220731 (Dec. 11, 2011).*

(Continued)

Primary Examiner — Sing P Chan
(74) Attorney, Agent, or Firm — Westerman, Hattori, Daniels & Adrian, LLP

(57) ABSTRACT

A method of the present invention for producing a polarizing plate including a polarizer and a transparent protective film provided on one side of the polarizer with an adhesive layer interposed therebetween, include the steps of: (A) irradiating at least one side of a polarizer with vacuum ultraviolet rays to treat a surface of the polarizer; (B) bonding a first transparent protective film to the side of the polarizer, which has been subjected to the surface treatment step (A), with a first adhesive layer interposed therebetween to produce a temporary polarizing plate; and (C) peeling off the first transparent protective film and a surface layer of the polarizer, which has been subjected to the surface treatment, from the temporary polarizing plate. A thin polarizing plate in which shrinkage-induced bending is reduced may be obtained by the method.

7 Claims, 7 Drawing Sheets

U.S. PATENT DOCUMENTS

| | | | |
|---|---|---|---|
| 7,929,086 B2 * | 4/2011 | Toyama et al. | 349/117 |
| 7,963,660 B2 * | 6/2011 | Hamamoto et al. | 359/601 |
| 2003/0151707 A1 * | 8/2003 | Kobayashi et al. | 349/96 |
| 2005/0151890 A1 * | 7/2005 | Nishimura | 349/20 |
| 2005/0243245 A1 * | 11/2005 | Taguchi et al. | 349/96 |
| 2006/0019100 A1 * | 1/2006 | Hatanaka et al. | 428/423.1 |
| 2006/0082708 A1 * | 4/2006 | Nagase et al. | 349/124 |
| 2006/0225827 A1 * | 10/2006 | Lei et al. | 156/64 |
| 2006/0225831 A1 * | 10/2006 | Lei et al. | 156/229 |
| 2007/0148483 A1 * | 6/2007 | Tomoguchi et al. | 428/500 |
| 2008/0018007 A1 * | 1/2008 | Nagase et al. | 264/1.34 |
| 2008/0112048 A1 * | 5/2008 | Katou et al. | 359/485 |
| 2008/0151164 A1 * | 6/2008 | Takemoto et al. | 349/118 |
| 2008/0239211 A1 * | 10/2008 | Suzuki et al. | 349/96 |
| 2009/0002608 A1 * | 1/2009 | Kameyama et al. | 349/96 |
| 2009/0059369 A1 * | 3/2009 | Otome et al. | 359/500 |
| 2009/0067047 A1 * | 3/2009 | Ueda et al. | 359/485 |
| 2009/0115945 A1 * | 5/2009 | Inokuchi et al. | 349/96 |
| 2010/0011566 A1 * | 1/2010 | Kim et al. | 29/592.1 |
| 2010/0039590 A1 * | 2/2010 | Miyatake et al. | 349/96 |
| 2010/0118399 A1 * | 5/2010 | Umemoto et al. | 359/485 |

FOREIGN PATENT DOCUMENTS

| | | | |
|---|---|---|---|
| JP | 2006220731 A | * | 8/2006 |
| JP | 2007193333 A | * | 8/2007 |
| JP | 2008-052170 A | | 3/2008 |
| JP | 2008058557 A | * | 3/2008 |
| JP | 2011221278 A | * | 11/2011 |

OTHER PUBLICATIONS

English Abstract of JP 2007-193333 (Dec. 11, 2011).*
English Abstract of JP 2011-221278 (Dec. 11, 2011).*
English Abstract of JP 2008-058557 (Dec. 11, 2011).*
Japanese Office Action dated Dec. 13, 2011, issued in corresponding Japanese Patent Application No. 2008-290151.

* cited by examiner

[Fig. 1]
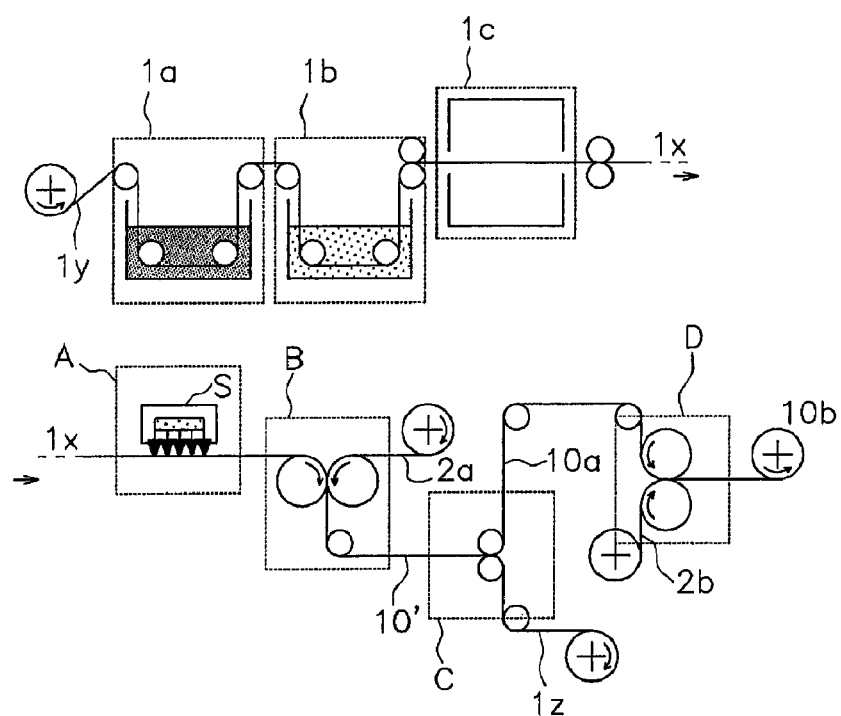

[Fig. 2(a)]
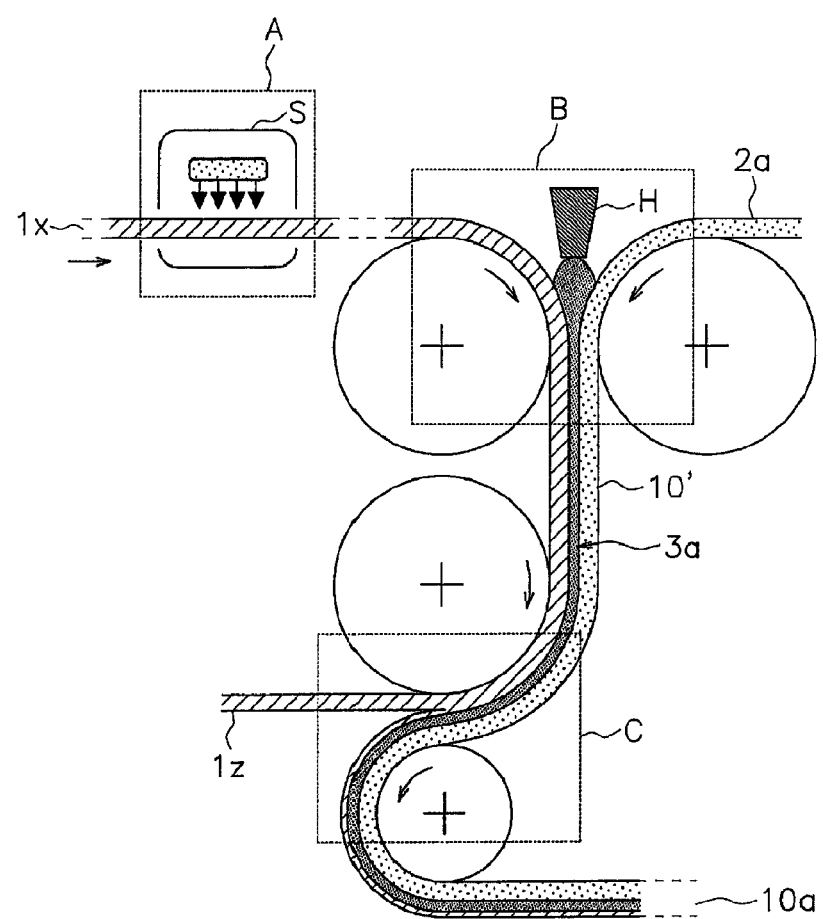

[Fig. 2(b)]
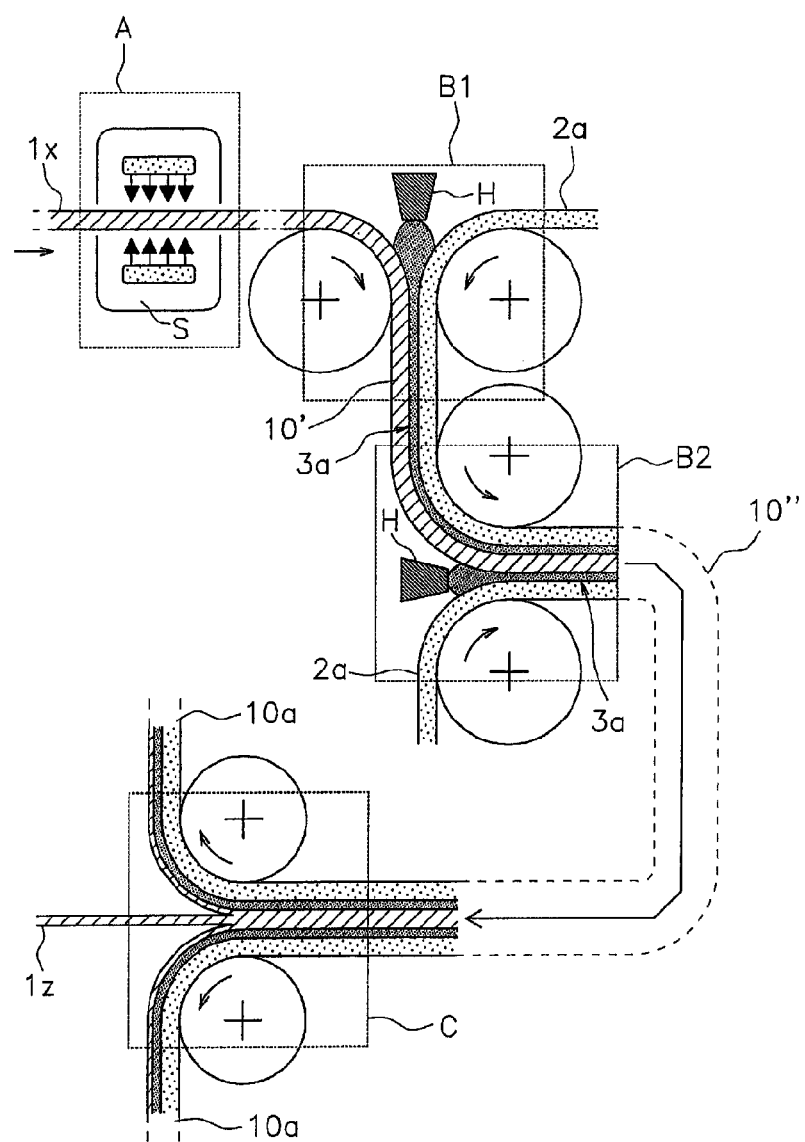

[Fig. 3]
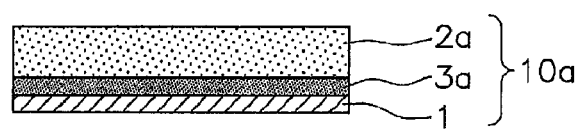
[Fig. 4]
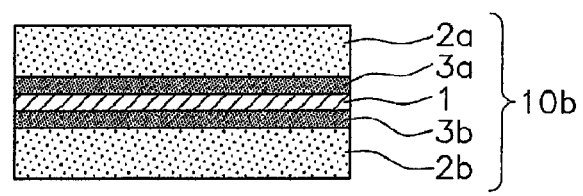
[Fig. 5]
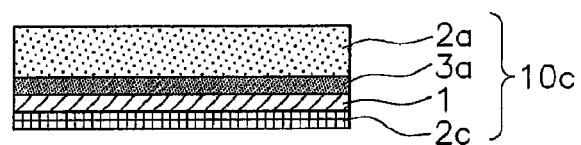

[Fig. 6]
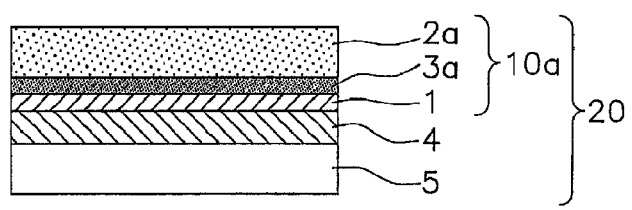
[Fig. 7]
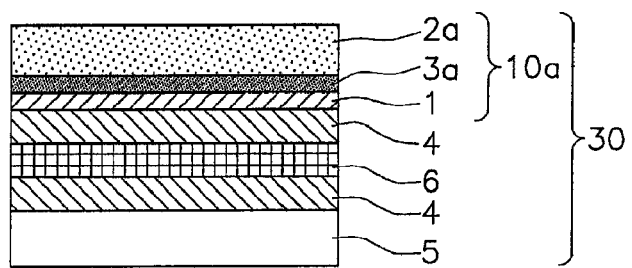

[Fig.8]
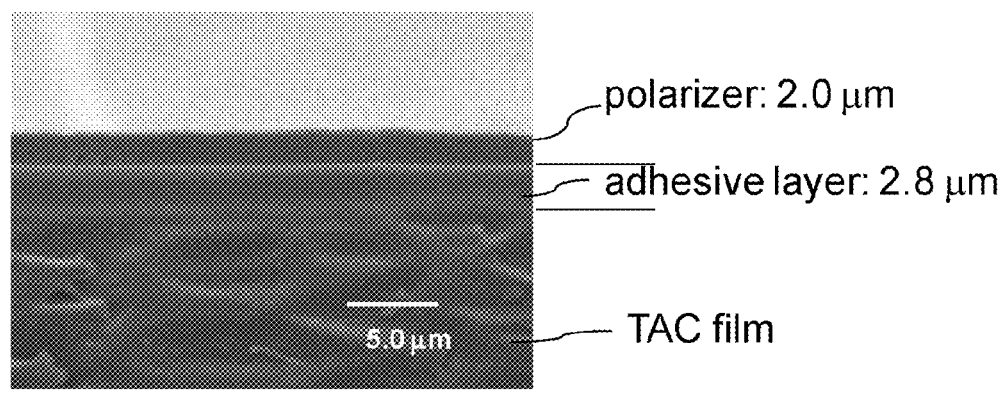

[Fig. 9]
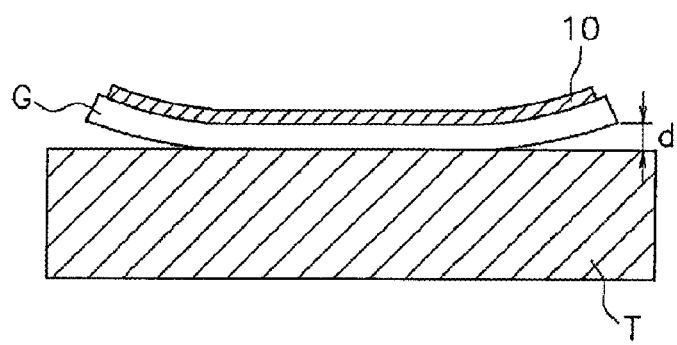

METHOD FOR PRODUCING POLARIZING PLATE, POLARIZING PLATE, OPTICAL FILM, AND IMAGE DISPLAY

BACKGROUND OF THE INVENTION

1. Field of the Invention

The present invention relates to a method for producing a polarizing plate. The present invention also relates to a polarizing plate obtained by the method. The polarizing plate may be used alone or in the form of a laminated optical film to form an image display such as a liquid crystal display (LCD), an organic electro-luminescent (EL) display, a cathode ray tube (CRT), or a plasma display panel (PDP).

2. Description of the Related Art

A variety of LCDs for use in televisions, personal computers, cellular phones, and so on are based on liquid crystal switching to visualize the polarization state, and based on the display principle, they use polarizers. Iodine polarizers having a structure produced by adsorbing a dichroic material such as iodine to a hydrophilic polymer film such as a polyvinyl alcohol film and stretching the film have high transmittance and optical properties of high degree of polarization. Therefore, they are the most popular and widely used polarizers. Specifically, in the process of uniaxially stretching a polyvinyl alcohol film, a dichroic material (as a dye) adsorbed to the polyvinyl alcohol molecule is oriented to constitute a polarizer. A method of stretching a polyvinyl alcohol film to a high stretch ratio is proposed to highly orient a dichroic material and to improve the optical properties (JP A 2002-28971). On the other hand, the polarizer should be protected from the external environment and prevented from expansion and shrinkage associated with heating/cooling or moisture absorption/release. In order to do so, therefore, the polarizer is used in the form of a polarizing plate, which includes the polarizer and a transparent protective film bonded to one side or both sides of the polarizer with an adhesive layer interposed therebetween.

As mentioned above, polarizing plates are used for a variety of LCDs. With a reduction in the thickness of small-sized LCDs for cellular phones or the like, a reduction in the thickness of polarizing plates has become an urgent need. In order to reduce the thickness of a polarizing plate, the thickness of its polarizer or its transparent protective film may be reduced.

The thickness of a polarizer can be reduced by reducing the thickness of a polyvinyl alcohol film, a raw material for the polarizer. However, if a thin polyvinyl alcohol film is used as a raw film and stretched to a high stretch ratio so that high optical properties can be obtained in the process of producing a polarizer, the film may be ruptured so that the productivity may be seriously reduced. On the other hand, if the stretch ratio is set at a low level, a problem may occur in which satisfactory polarizing properties cannot be obtained.

Specifically, when a polarizer of a polyvinyl alcohol film is uniaxially stretched to a high stretch ratio in the longitudinal direction, its width and thickness are reduced depending on the stretch ratio. In order to achieve high polarizing properties in this case, the polarizer should generally be stretched to a higher stretch ratio. Therefore, the raw film for the polarizer should be somewhat thick so that a high-performance uniform polarizer having satisfactory swelling properties and stretchability can be obtained. Since film stretching is based on permanent deformation caused by application of stress and impress to the film, weaker regions of the film are more intensively stretched. Therefore, highly stretched portions of a film are more reduced in thickness and more likely to be a cause of film rupture. This is more significant when the raw film is thinner or stretched to a higher stretch ratio. Therefore, it has been difficult to use a thin raw film, because it is necessary to reduce film ruptures as much as possible for stable polarizer production.

On the other hand, there is a problem in which when a thin transparent protective film is used, the resulting polarizing plate may be bent because of its reduced stiffness. In particular, the shrinkage of a polarizer in an absorption axis direction in a thermostatic humidified environment, which is considered to be based on relaxation of polarizer stretching, becomes a cause of liquid crystal panel warp, when a polarizing plate is bonded in the LCD manufacturing process. Under certain circumstances, the resulting LCD may be significantly bent and come into contact with a backlight or a backside film such as a diffusing plate so that the display characteristics may be significantly degraded, or the resulting LCD may come into contact with a bezel for fixing the liquid crystal panel to cause the problem of light leakage.

In recent years, the size of polarizing plates for use in LDCs has been necessarily increased with the greater size of the LCDs, but the thickness of liquid crystal panels themselves has not been changed. Therefore, there is a problem in which distortion associated with the expansion and shrinkage of polarizing plates may cause bending of LCDs themselves. This may cause major trouble with the display characteristics, and therefore a reduction of the shrinkage of polarizing plates has been demanded. More specifically, heating- or humidifying-induced relaxation of polarizers may cause the phenomenon of significant shrinkage in the stretching direction, which may cause the problem of the generation of stress or distortion.

For the problems described above, rigid transparent protective films may be used, or thinner polyvinyl alcohol films may be used as described above. In the former case, however, the stress generated on expandable and shrinkable polyvinyl alcohol films themselves cannot be reduced, and in the latter case, there are limits to the reduction in the thickness of polyvinyl alcohol films as described above. In addition, a polyvinyl alcohol film may be stretched to a low stretch ratio so as to form a polarizer with relaxed orientation and reduced contractile force. However, if the stretch ratio is lowered so that the contractile force can be reduced, the iodine complex orientation itself will be reduced, so that serious degradation in the optical properties may occur and that stretching uniformity may be reduced, which makes it difficult to produce a polarizing plate with good properties.

SUMMARY OF THE INVENTION

An object of the present invention is to provide a method for producing a thin polarizing plate in which shrinkage-induced bending is reduced.

It is another object of the present invention to provide a polarizing plate obtained by the above method, and to provide an optical film in which the polarizer or the polarizing plate is laminated and to provide an image display, such as a liquid crystal display, using such a polarizing plate or such an optical film.

As a result of investigations for solving the problems, the inventors have found that the objects can be achieved with a method for producing a polarizing plate, so that the present invention has been completed.

The present invention relates to a method for producing a polarizing plate including a polarizer and a transparent protective film provided on one side of the polarizer with an adhesive layer interposed therebetween, including the steps of:

(A) irradiating at least one side of a polarizer with vacuum ultraviolet rays to treat a surface of the polarizer;

(B) bonding a first transparent protective film to the side of the polarizer, which has been subjected to the surface treatment step (A), with a first adhesive layer interposed therebetween to produce a temporary polarizing plate; and (C) peeling off the first transparent protective film and a surface layer of the polarizer, which has been subjected to the surface treatment, from the temporary polarizing plate.

In the method for producing a polarizing plate, the polarizer is preferably a product produced by subjecting a hydrophilic polymer film to at least a dyeing process with a dichroic material and a stretching process. And the hydrophilic polymer film is preferably a polyvinyl alcohol film and the dichroic material is iodine. And the polarizer is preferably a product produced by further subjecting the hydrophilic polymer film to at least one selected from a swelling process and a crosslinking process.

In the method for producing a polarizing plate, a light source used for the vacuum ultraviolet irradiation in the surface treatment step (A) preferably has intensity such that it has a half-value width of 50 nm or less at a center wavelength.

In the method for producing a polarizing plate, an excimer lamp, an excimer laser or a free electron laser is preferably used as a light source for the vacuum ultraviolet irradiation in the surface treatment step (A).

In the method for producing a polarizing plate, when the surface treatment step (A) to the peeling step (C) is performed to both sides of the polarizer, the each step can be sequentially or simultaneously performed.

The present invention also relates to a polarizing plate produced by the above method for producing a polarizing plate, including:

the polarizer comprising the surface layer formed by the peeling;

the first transparent protective film provided on one side of the polarizer opposite to another side of the polarizer formed by the peeling; and the first adhesive layer interposed between the polarizer and the first transparent protective film.

The present invention also relates to a polarizing plate further comprising a second transparent protective film or a transparent protective layer provided on the side formed by the peeling of the above polarizing plate with a second adhesive layer interposed therebetween.

The present invention also relates to an optical film in which at least one layer of the above polarizing plate is laminated.

The present invention also relates to an image display, comprising the above polarizing plate or the optical film.

In an embodiment of the present invention, a polarizing plate including a thin layer polarizer and a transparent protective film provided on one side of the polarizer with an adhesive layer interposed therebetween is produced by the method described below. In the surface treatment step (A), the polarizer is first irradiated with vacuum ultraviolet rays so that the surface layer of the polarizer is modified. The modification by the surface treatment step (A) causes cohesive failure of the surface layer of the polarizer. In the bonding step (B), a first transparent protective film is then bonded to the surface of the polarizer having the surface layer modified by the surface treatment step (A), with a first adhesive layer interposed therebetween, so that a temporary polarizing plate is produced. In the peeling step (C), the first transparent protective film and the surface layer having undergone the cohesive failure in the surface-treated polarizer are then peeled off from the temporary polarizing plate. The surface layer of the polarizer modified by the surface treatment step (A) maintains non-degraded optical properties and functions as a thin polarizer, although it is a very thin layer. The surface layer of the polarizer undergoes the cohesive failure and therefore is more strongly bonded to the first adhesive layer than to the main body of the polarizer so that it can be peeled off from the main body of the polarizer together with the first transparent protective film in the process of peeling off the first transparent protective film. Thus, a polarizing plate having a thin polarizer is obtained. In the resulting polarizing plate, the polarizer is made of the surface layer of the original polarizer, which has undergone the cohesive failure, and the surface layer can be stably and uniformly peeled off.

A conventional polarizing plate has a 20 to 25 µm-thick polarizer. In contrast, for example, the polarizing plate of the present invention may have an about 2 µm-thick polarizer. In the polarizing plate of the present invention, therefore, the thickness of the polarizer may be about $\frac{1}{10}$ of the conventional thickness. The contractile force of the polarizer is proportionate to the thickness of the polarizer. Therefore, the contractile force of the polarizing plate of the present invention can be reduced to $\frac{1}{10}$ of that of the conventional polarizing plate, if the contraction stress per unit area is equal to each other.

In general, a very strong contractile force acts on a polarizing plate, when its polarizer is shrunk in a high-temperature environment or a high-temperature, high-humidity environment. In the polarizing plate of the present invention, however, the stress caused by the shrinkage of the polarizer can be highly reduced, because the polarizer is very thin. In the polarizing plate of the present invention, therefore, shrinkage-induced bending can be prevented or reduced, so that the problem of the deformation of polarizing plates, polarizing plate-laminated optical films or LCDs can be solved.

In conventional LCDs, the stress caused by the shrinkage of polarizing plates may be a cause of liquid crystal panel warp. Also in a conventional retardation plate or liquid crystal panel formed with an integrated polarizing plate, the generation of photo-elasticity associated with the shrinkage of the polarizing plate may change the display characteristics of the liquid crystal panel, which becomes a cause of unevenness of display or leakage of light. However, when the polarizing plate of the present invention having a thin polarizer is used, the stress caused by the shrinkage of the polarizing plate can be reduced, so that the problem of the warp or the photo-elasticity can be reduced, and if the problem occurs, it can be easily corrected. In the polarizing of the present invention, warp is reduced to a low level, so that LCD bending can be suppressed and that the problem of significant degradation in display characteristics or the problem of light leakage can be solved, which would otherwise be caused by the contact with a backlight or a backside film such as a diffusing plate or by the contact with a bezel for fixing the liquid crystal panel.

BRIEF DESCRIPTION OF THE DRAWINGS

FIG. 1 is a schematic diagram showing an example of the polarizing plate production method of the present invention;

FIG. 2A is a schematic diagram showing an example of the polarizing plate production method of the present invention;

FIG. 2B is a schematic diagram showing an example of the polarizing plate production method of the present invention;

FIG. 3 is a cross-sectional view showing an example of the polarizing plate of the present invention;

FIG. 4 is a cross-sectional view showing an example of the polarizing plate of the present invention;

FIG. 5 is a cross-sectional view showing an example of the polarizing plate of the present invention;

FIG. 6 is a cross-sectional view showing an example of the case where a pressure-sensitive adhesive layer is provided on the polarizing plate of the present invention;

FIG. 7 is a cross-sectional view showing an example of the optical film using the polarizing plate of the present invention;

FIG. 8 is an electron micrograph showing the cross-section of the polarizing plate obtained in Example 1; and FIG. 9 is a cross-sectional view showing the placement of a polarizing plate-carrying glass plate for the measurement of curling in the examples.

DETAILED DESCRIPTION OF THE PREFERRED EMBODIMENTS

The method of the present invention for producing a polarizing plate is described below with reference to the drawings. FIG. 1 is a schematic diagram showing a method for producing a polarizing plate in an embodiment of the present invention. FIG. 1 also schematically shows a method for producing a polarizer for use in the polarizing plate production method. FIG. 1 shows a continuous process including the respective steps from the production of the polarizer to the production of the polarizing plate. Alternatively, however, the production of the polarizer and the production of the polarizing plate may be separately performed. Also in FIG. 1, the respective steps for the production of the polarizer and the respective steps for the production of the polarizing plate are performed in a continuous process. Alternatively, however, the respective steps may also be separately performed.

Referring to FIG. 1, a hydrophilic polymer film $1y$ fed from a feeding roll is sequentially subjected to ($1a$) a dyeing process in a dyeing bath, ($1b$) a stretching process in a stretching bath, and ($1c$) a drying process in a dryer, so that a polarizer $1x$ for use in the polarizing plate production method of the present invention is produced. Although not shown in FIG. 1, a swelling process, a crosslinking process, a washing process, or the like may also be performed as needed.

The polarizer $1x$ produced as described above is first subjected to a surface treatment step (A). In the surface treatment step (A) shown in FIG. 1, one side of the polarizer $1x$ is irradiated with vacuum ultraviolet rays from a vacuum ultraviolet radiation apparatus S, so that the surface of the polarizer $1x$ is modified.

In the bonding step (B), a first transparent protective film $2a$ fed from a feeding roll is bonded to the one side of the polarizer $1x$, which has been subjected to the surface treatment step (A), with a first adhesive layer interposed therebetween, so that a temporary polarizing plate $10'$ is produced. The bonding step (B) is performed using a pair of rolls. In FIG. 1, the first adhesive layer is omitted. In the peeling step (C), the first transparent protective film $2a$ and the surface layer of the polarizer $1x$ is peeled off from the temporary polarizing plate $10'$ so that a polarizing plate $10a$ having a thin layer polarizer is produced. Although not shown in the drawing, peeling means is provided in the peeling step (C).

In the bonding step (D), a second transparent protective film $2b$ fed from a feeding roll is bonded to the surface of the polarizer of the polarizing plate $10a$, which is formed by the peeling, with a second adhesive layer interposed therebetween, so that a polarizing plate $10b$ is produced which has the thin layer polarizer and the transparent protective films $2a$ and $2b$ provided on both sides of the thin layer polarizer. In FIG. 1, the second adhesive layer is also omitted. In the peeling step (C), a polarizer $1z$ which is peeled off from the thin layer polarizer is wound on a take-up roll.

FIG. 2A is a schematic diagram specifically and concisely illustrating only parts for the surface treatment step (A), the bonding step (B) and the peeling step (C) in FIG. 1. In the bonding step (B) shown in FIG. 2A, the one side of the polarizer $1x$, which has been subjected to the surface treatment step (A), is bonded to the first transparent protective film $2a$ with a first adhesive layer $3a$ that is formed from a first adhesive supplied from a supply port H, so that the temporary polarizing plate $10'$ is produced.

FIG. 2B shows a case where both sides of the polarizer are subjected to the surface treatment step (A) to the peeling step (C). In the surface treatment step (A) shown in FIG. 2B, both sides of the polarizer $1x$ are subjected to surface modification using a vacuum ultraviolet radiation apparatus S. In the bonding step (B1), one side of the polarizer $1x$, which has been subjected to the surface treatment step (A), is bonded to a first transparent protective film $2a$ with a first adhesive layer $3a$ that is formed from a first adhesive supplied from a supply port H. In the bonding step (B2), the other side of the polarizer $1x$, which has been subjected to the surface treatment step (A), is also bonded to another first transparent protective film $2a$ with another first adhesive layer $3a$, so that a temporary polarizing plate $10''$ is produced which has the polarizer $1x$ and the first transparent protective films $2a$ provided on both sides of the polarizer $1x$. In the peeling step (C), the first transparent protective films $2a$ and surface layers of the polarizer $1x$ are peeled off from both sides of the temporary polarizing plate $10''$, so that two polarizing plates $10a$ each having a thin layer polarizer and are produced at the same time. In FIG. 2B, both sides of the polarizer $1x$ are simultaneously subjected to the surface treatment step (A) and the peeling step (c), while the bonding step (B) is sequentially performed. However, both sides of the polarizer $1x$ may be sequentially or simultaneously subjected to the surface treatment step (A) to the peeling step (C) as needed.

The surface treatment step (A) is performed by irradiating at least one side of the polarizer with vacuum ultraviolet rays. Electromagnetic waves with wavelengths of 10 to 200 nm are generally called vacuum ultraviolet rays. The vacuum ultraviolet irradiation changes the state of the surface layer of the polarizer to facilitate the peeling-off of the surface layer of the polarizer in the peeling step (C). If the vacuum ultraviolet irradiation degrades the properties of the surface layer of the polarizer, display characteristics may be undesirably degraded when the polarizer is used in an image display device such as an LCD. In the surface treatment step (A), therefore, the vacuum ultraviolet irradiation should be performed in such a manner that it can change the state of the surface layer of the polarizer but cannot change or can only slightly change the optical properties of the polarizer.

For example, when iodine is used as a dichroic material in the polarizer, a polyiodine ion complex is oriented in the hydrophilic polymer film. When the iodine-containing polarizer is irradiated with vacuum ultraviolet rays at an irradiation wavelength corresponding to the absorption wavelength of the iodine complex of polyiodine ions, the vacuum ultraviolet rays can be absorbed into the iodine complex rather than into the hydrophilic polymer film so that the iodine complex can be destroyed. In general, the iodine complex absorbs wavelengths of up to about 250 nm. Therefore, the iodine complex can be destroyed when irradiated with active energy rays with a wavelength of 250 nm or more. The absorption wavelength of iodide ions is about 190 nm. Iodide ions have a very sharp absorption peak in contrast to the polyiodine ion complex having a broad absorption band in a visible light region or relatively long wavelength region. Therefore, when vacuum ultraviolet rays or active energy rays are applied at a wavelength of 190 nm or more, the light is absorbed by the iodide ions. Thus, when vacuum ultraviolet rays or active energy rays are applied at a wavelength of 190 nm or more, the light is absorbed by iodine or the iodine complex so that the iodine complex can be directly destroyed, and the absorbed light can be converted into heat to thermally damage the polarizer, which may affect the optical properties of the polarizer.

When a polyvinyl alcohol film is used as a hydrophilic polymer film for the polarizer, the vacuum ultraviolet rays preferably has a center wavelength (absorption peak) of 180 nm or less, because the film absorbs light at a wavelength of about 180 nm or shorter wavelengths. The vacuum ultraviolet irradiation can modify the hydrophilic polymer film, depending on the vacuum ultraviolet rays' intensity. When vacuum ultraviolet rays with a center wavelength of 180 nm or less is applied, the light is almost absorbed at the uppermost surface of the hydrophilic polymer film so that the effect of the vacuum ultraviolet rays can be blocked at the uppermost surface, which is preferred for the production of the thin layer polarizer.

In the surface treatment step (A) including vacuum ultraviolet irradiation, therefore, an irradiation wavelength of more than 200 nm can be absorbed by iodine and therefore is not preferred. On the other hand, as the wavelength of the applied vacuum ultraviolet rays is short, the transmission through the hydrophilic polymer film significantly increases. Therefore, in order to modify only the surface layer of the polarizer and peel off the surface layer, the applied vacuum ultraviolet rays preferably has a center wavelength of 50 nm or more, more preferably 100 nm or more.

The intensity of the light source used for the vacuum ultraviolet rays is preferably such that a single emission peak is provided with a narrow half-value width and high photon energy. Such a light source allows more efficient direct cleavage of the chemical bond to the surface layer of the polarizer. In addition, such a light source can more effectively prevent unnecessary light absorption from causing undesirable degradation of the polarizer. At the central wavelength of the vacuum ultraviolet rays, the half-value width is preferably 50 nm or less, more preferably 40 nm or less, even more preferably 30 nm or less.

The light source of the vacuum ultraviolet rays to be used is preferably an excimer lamp, an excimer laser, or a free electron laser. Examples of such light source include an $Xe_2$ excimer laser, an $F_2$ excimer laser, a $Kr_2$ excimer laser, an $Ar_2$ excimer laser, a harmonic laser with a non-linear optical device, an $Xe_2$ excimer lamp, a $Kr_2$ excimer lamp, and an $Ar_2$ excimer lamp. In particular, an $Xe_2$ excimer lamp with a central wavelength of 172 nm is preferred.

In the surface treatment step (A), vacuum ultraviolet rays with a central wavelength of 180 nm is generally applied at an intensity of 2 to 50 mW/cm$^2$, preferably 4 to 20 mW/cm$^2$, for a time period of 1 to 300 seconds, preferably 3 to 200 seconds.

In the bonding step (B), a first transparent protective film is bonded to the surface of the polarizer, which has been subjected to the surface treatment step (A), with a first adhesive layer interposed therebetween. The bonding step (B) provides a temporary polarizing plate.

The first adhesive layer may be formed by applying a first adhesive to the surface of the polarizer, which has been subjected to the surface treatment step (A), and/or to the first transparent protective film. As shown in FIG. 2A, 2B, or 3, the first adhesive may be supplied to the space between the surface of the polarizer and/or the first transparent protective film. The applied first adhesive may be cured, depending on the type of the adhesive, before or after the bonding, when an adhesive layer is formed.

An appropriate method of applying the adhesive may be selected depending on the viscosity of the adhesive or the desired thickness. Examples of such an application method include methods with a reverse coater, a gravure coater (direct, reverse, or offset), a bar reverse coater, a roll coater, a die coater, a bar coater, a rod coater, or the like. Any other application method such as dipping may also be used as needed.

The surface of the polarizer, which has been subjected to the surface treatment step (A), is bonded to the first transparent protective film with the first adhesive layer interposed therebetween. The bonding may be performed using a roll laminator or the like.

If necessary, an undercoating agent for the adhesive may be applied to the surface of the polarizer, which has been subjected to the surface treatment step (A), and/or the first transparent protective film in the process of forming the first adhesive layer, so that the adhesive can be improved.

In the peeling step (C), the treated surface layer of the polarizer and the first transparent protective film are peeled off from the temporary polarizing plate obtained in the bonding step (B). The peeling step (C) provides a polarizing plate according to the present invention, which includes a very thin polarizer layer and the first transparent protective film placed on one side of the polarizer layer. When the surface treatment step (A) is performed under constant vacuum ultraviolet irradiation conditions, a polarizer layer with a substantially uniform thickness can be peeled off. The peeling step (C) may be performed using general peeling means such as 90° peeling or 180° peeling. In the polarizing plate of the present invention obtained as described above, the thin polarizer layer generally has a thickness of 1 to 4 µm.

A description is given below of materials for use in the polarizing plate production method of the present invention.

The polarizer for use in the polarizing plate production method of the present invention is preferably obtained by subjecting a hydrophilic polymer film to at least a dyeing process with a dichroic material such as iodine or a dichroic dye and a stretching process. In the production of the polarizer, the hydrophilic polymer film may also be subjected to an additional process such as a swelling process or a crosslinking process. Besides the above, the polarizer may be a polyene oriented film such as a dehydration product of a polyvinyl alcohol film or a dehydrochlorination product of a polyvinyl chloride film.

In a preferred mode of the polarizer production, for example, the respective processes are continuously performed, while the hydrophilic polymer film is fed. Alternatively, however, each process may be performed in a batch manner. When the respective processes are continuously performed to produce the polarizer, the original hydrophilic polymer film is preferably used in the form of a roll. In the batch process, a cut piece of the hydrophilic polymer film with a specific size is preferably used.

The thickness of the hydrophilic polymer film is generally, but not limited to, from about 30 to about 110 µm, preferably from 50 to 100 µm, in view of stretchability. If the hydrophilic polymer film is too thin, for example, 20 µm or less in thickness, it may be difficult to perform high-ratio stretching because of some difficulty in film stretching or uniform stretching, which is not preferred for the production of a high-performance polarizer.

The hydrophilic polymer film used to form the polarizer may be any of various types such as a polyvinyl alcohol film, a partially-formalized polyvinyl alcohol film, and a partially-saponified ethylene-vinyl acetate copolymer film.

In an embodiment of the present invention, the polarizer preferably includes a polyvinyl alcohol film as the hydrophilic polymer film and iodine used as the dichroic material in the film. A description is given below of a typical case using a polyvinyl alcohol film as the hydrophilic polymer film.

The polyvinyl alcohol resin constituting the polyvinyl alcohol film preferably has a degree of polymerization of about 1000 to about 10000, preferably of 1000 to 5000. If its polymerization degree is too low, it can tend to be broken in the process of stretching at a certain ratio. If its degree of polymerization is too high, unusual tension can be required for the stretching process, and thus mechanical stretching of it can be impossible. The polyvinyl alcohol film used to form the polarizer may be produced by any appropriate method (such as a casting method including casting a solution of a resin in water or an organic solvent and forming it into a film, a cast method, or an extrusion method).

The polarizer may be produced by any appropriate method depending on the purpose, the material to be used, the conditions, and so on. For example, a method that may be used includes subjecting the polyvinyl alcohol film to a series of producing processes generally including swelling, dyeing, crosslinking, stretching, washing, and drying. Except for the drying process, each process may be performed while the polyvinyl alcohol film is immersed in a bath containing a solution necessary for each process. Concerning the processes of swelling, dyeing, crosslinking, stretching, washing, and drying, the order of the processes, the number of times of each process, or the presence or absence of each processes may be appropriately determined depending on the purpose, the materials to be used and the conditions. For example, some treatments may be simultaneously performed in a single process, and swelling treatment, dyeing treatment and crosslinking treatment may be performed at the same time. For example, crosslinking treatment before or after stretching treatment is preferably employed.

The swelling process is typically performed by immersing the hydrophilic polymer film in a treatment bath containing water. By this treatment, the surface of the hydrophilic polymer film is cleaned of dirt and an anti-blocking agent, and the hydrophilic polymer film is allowed to swell so that unevenness such as uneven dyeing can be prevented. Glycerin, potassium iodide and so on may be added, as appropriate, to the swelling bath. The temperature of the swelling bath is generally from about 20 to about 50° C., and the time of immersion in the swelling bath is generally from about 5 to about 30 seconds. Any appropriate combination of swelling bath temperature and time may be used depending on the state of the film. When immersed in the swelling bath, the hydrophilic polymer film absorbs the solution in the swelling bath and swells so that its length becomes 1.1 to 2 times longer than the length before the swelling. In the swelling bath, the film may also be uniaxially stretched in the longitudinal axis direction (the longitudinal direction). The stretch ratio in the swelling bath may be about 1 to about 2 times the swelling amount. Any appropriate stretching machine such as a roller stretching machine, a tenter stretching machine, or batch stretching machine may be used for the uniaxial stretching.

The dyeing process is typically performed by immersing the hydrophilic polymer film in a treatment bath containing a dichroic material such as iodine and organic dyes. Iodine is preferable as the dichroic material. Water is generally used as a solvent for the dyeing bath solution, to which a proper amount of an organic solvent compatible with water may be added. The concentration of the dichroic material in the solution generally, but not limited to, from 0.005 to 2% by weight, preferably 0.1 to 1% by weight. When iodine is used as the dichroic material, the dyeing bath solution preferably contain an aid such as an iodide, so that the dyeing efficiency can be improved. Examples of the iodide include potassium iodide, lithium iodide, sodium iodide, zinc iodide, aluminum iodide, lead iodide, copper iodide, barium iodide, calcium iodide, tin iodide, and titanium iodide. The concentration of the aid in the solution generally, but not limited to, from 0.01 to 10% by weight, preferably 0.02 to 8% by weight. The temperature of the dyeing bath is generally from about 20 to about 70° C., and the time of immersion in the dyeing bath is generally from about 1 to about 20 minutes.

When the hydrophilic polymer film is immersed in the dyeing bath, the dichroic material is diffused and infiltrated into the swelling film based on the concentration difference between the swelling film and the dyeing bath, so that the film is dyed. In general, therefore, the higher the concentration or temperature of the dyeing bath or the longer the dyeing bath time, the more deeply the hydrophilic polymer film is dyed. An appropriate combination of dyeing bath temperature and time may be used depending on the optical density of the polarizer to be produced or the strength of the film in the dyeing bath. In the dyeing bath, the film may also be uniaxially stretched in the longitudinal axis direction (the longitudinal direction). The stretching means may be the same as that in the swelling process.

The crosslinking process is, if needed, typically performed by immersing the dyed hydrophilic polymer film in a treatment bath containing a crosslinking agent. Crosslinking between the molecules in the film is accelerated by the immersion of the film to the crosslinking bath. Any appropriate crosslinking agent may be used. Examples of the crosslinking agent include boron compounds such as boric acid and borax; crosslinkable water-soluble organic compounds such as glyoxal, and glutaraldehyde. One or more of these crosslinking agents may be used alone or in combination. Water is generally used as a solvent for the crosslinking bath solution, to which a proper amount of an organic solvent compatible with water may be added. The crosslinking agent is generally used in an amount of 0.05 to 10 parts by weight, based on 100 parts by weight of the solvent. The crosslinking bath solution preferably contains an aid such as an iodide, so that uniform in-plane properties can be easily obtained. Examples of the iodide are the same as those in the case of the dyeing process. The crosslinking agent is preferably boron, and the crosslinking aid is preferably potassium iodide. The crosslinking bath temperature is generally from about 20 to about 70° C., preferably from 30 to 60° C. Any appropriate combination of conditions of immersion in the crosslinking bath may be used depending on the desired content or distribution of the crosslinking agent in the film or the strength or tension of the film in the crosslinking bath. The time of immersion in the crosslinking bath is generally about 1 second to about 15 minutes, preferably from 5 seconds to 10 minutes. In the crosslinking bath, the film may be uniaxially stretched in the longitudinal axis direction (the longitudinal direction). For example, the stretch ratio in the crosslinking bath may be from about 1 to about 3 times, preferably from 1 to 2 times with respect to the length of the hydrophilic polymer film immediately after the dyeing process. The stretching means may be the same as that in the swelling process.

The stretching process, described above, may be performed at any stage. Specifically, the stretching process may be performed before or after the dyeing treatment, performed simultaneously with a swelling treatment, the dyeing treatment, or a crosslinking treatment, or performed after the crosslinking treatment. The hydrophilic polymer film is generally stretched to a total stretched ratio of 4 or more, preferably 4 to 8, more preferably 5 to 7, even more preferably 5 to 6.5. Any appropriate specific method may be used in the stretching process. For example, when a wet stretching method is used, the hydrophilic polymer film may be stretched to a specific stretch ratio in the treatment bath. Water or an organic solvent (e.g., ethanol) may be used as a solvent for the stretching bath. A solution containing any of various metal salts, an iodide and boron or a zinc compound is preferably used in the stretching bath. For example, the stretching bath preferably contains boron and an iodide (potassium iodide). For example, the total content of both components is preferably from 2 to 18% by weight, more preferably from 5 to 15% by weight. The stretch ratio in the stretching process may be from about 1.05 to 6 times with respect to the length of the hydrophilic polymer film immediately after the upstream process (e.g., the crosslinking process). The stretching bath temperature is typically from about 25 to about 75° C., preferably from 30 to 70° C. The stretching time is typically from about 10 to about 180 seconds, preferably from 20 to 90 seconds. The stretching means may be the same as that in the swelling process. Appropriate stretching conditions may be selected depending on the desired polarizing properties of the polarizer.

The washing process is, if needed, performed by immersing the hydrophilic polymer film on which the above-described various treatments are carried out in a treatment bath. Unnecessary residues can be washed away from the hydrophilic polymer film by the washing process. The water-washing bath may be of pure water or an aqueous solution of an iodide such as potassium iodide and sodium iodide. The aqueous iodide solution preferably has a concentration of 0.5 to 20% by weight, preferably 1 to 10% by weight. An aid such as zinc sulfate and zinc chloride may be added to the aqueous iodide solution. The temperature of the washing bath is preferably from 15 to 40° C. The immersion time may be from about 2 to about 20 seconds. The washing process may be performed only once or twice or more, if necessary. When the washing process is performed twice or more, the type and concentration of the additive contained in the washing bath for each treatment may be controlled as appropriate. For example, the washing process may include immersing the hydrophilic polymer film in an aqueous potassium iodide solution after any of the above treatments and rinsing the film with pure water. In the washing process, an organic solvent compatible with water (such as ethanol) may be added as appropriate in order to modify the surface of the polarizer or increase the efficiency of drying of the polarizer. The temperature of the washing process and the immersion time may be appropriately determined depending on the desired optical properties of the polarizer. Too high temperature or too long immersion time may undesirably cause orientational relaxation of the film and the iodine complex so that the degree of polarization may tend to be low.

The optical properties of the polarizer depend on the type and content of a polyiodine ion complex. In general, an $I_3^-$ complex having absorption at a center wavelength of about 470 nm and an $I_5^-$ complex having absorption at a center wavelength of about 600 nm are present, and the hue of the polarizer depends on the amount of these complexes. The balance between the amounts of these complexes is determined based on the chemical equilibrium. When the hydrophilic polymer film is immersed in the washing bath (an iodide solution), the amounts of iodide ions and alkali metal ions as counter ions in the film are changed so that the equilibrium can be shifted. If the aqueous boric acid solution remains on the surface of the hydrophilic polymer film, the boric acid may be crystallized on the film surface under certain circumstances to form contaminants in the process of bonding the transparent protective film. As described above, the remaining boron that has been used in the stretching process may be washed away from the hydrophilic polymer film with the washing bath (an iodide solution).

Any appropriate methods such as natural drying, blow drying, and drying by heating may be used in the drying process. In the case of drying by heating, for example, the drying temperature is generally from about 25 to about 80° C., preferably 30 to 75° C.

The polarizer for use in the production of the present invention preferably has a moisture content of 25% by weight or less, more preferably of 4 to 20% by weight, still more preferably of 8 to 20% by weight. If the moisture content is more than 25% by weight, the size of the resulting polarizing plate can significantly change, and there is a possibility of causing a problem is in which the change in size can be significant at high temperature or at high temperature and high humidity. In addition, increased moisture content may largely expand the polarizer to hinder successful execution of the peeling step (C). That is, the peeling-off of the surface layer of the polarizer is cohesive failure, and therefore, the stretching of the film is not preferable in view of orientation since the stress is not transferred to the fractured surface and the energy is spent for the expansion. On the other hand, too low a moisture content is not preferable from the viewpoint of handleability. From these viewpoints, the moisture content of the polarizer is preferably within the range as described above.

The moisture content of the polarizer for use in the present invention may be adjusted by any appropriate method. For example, the moisture content may be adjusted by controlling the conditions of the drying step in the process of manufacturing the polarizer.

The moisture content of the polarizer may be measured by the method described below. A sample (100×100 mm in size) is cut from the polarizer, and the initial weight of the sample is measured. The sample is then dried at 120° C. for 2 hours and measured for dry weight. The moisture content is determined according to the following formula: moisture content (% by weight)={(the initial weight)−(the dry weight)/(the initial weight)}×100. The measurement of each weight is performed three times, and the average value is used.

A thermoplastic resin with a high level of transparency, mechanical strength, thermal stability, moisture blocking properties, isotropy, and the like may be used as a material for forming the first transparent protective film, which is used in the production method for a polarizing plate of the present invention. Examples of such a thermoplastic resin include cellulose resins such as triacetylcellulose, polyester resins, polyethersulfone resins, polysulfone resins, polycarbonate resins, polyamide resins, polyimide resins, polyolefin resins, (meth)acrylic resins, cyclic olefin polymer resins (norbornene resins), polyarylate resins, polystyrene resins, polyvinyl alcohol resins, and any mixture thereof. The transparent protective film is generally laminated to one side of the polarizer with the adhesive layer, but thermosetting resins or ultraviolet curing resins such as (meth)acrylic, urethane, acrylic urethane, epoxy, or silicone resins may be used to other side of the polarizer for the transparent protective film. The transparent protective film may also contain at least one type of any appropriate additive. Examples of the additive include an ultraviolet absorbing agent, an antioxidant, a lubricant, a plasticizer, a release agent, an anti-discoloration agent, a flame retardant, a nucleating agent, an antistatic agent, a pigment, and a colorant. The content of the thermoplastic resin in the transparent protective film is preferably from 50 to 100% by weight, more preferably from 50 to 99% by weight, still more preferably from 60 to 98% by weight, particularly preferably from 70 to 97% by weight. If the content of the thermoplastic resin in the transparent protective film is 50% by weight or less, high transparency and other properties inherent in the thermoplastic resin can fail to be sufficiently exhibited.

Moreover, as is described in JP-A No. 2001-343529 (WO 01/37007), polymer films, for example, resin compositions including (A) thermoplastic resins having substituted and/or non-substituted imido group in sidechain, and (B) thermoplastic resins having substituted and/or non-substituted phenyl and nitrile group in sidechain may be mentioned as the first transparent protective film. As an illustrative example, a film may be mentioned that is made of a resin composition including alternating copolymer comprising iso-butylene and N-methyl maleimide, and acrylonitrile-styrene copolymer. A film comprising mixture extruded article of resin compositions etc. may be used. Since the films are less in retardation and less in photoelastic coefficient, faults such as unevenness due to a strain in a polarizing plate can be removed and besides, since they are less in moisture permeability, they are excellent in durability under humidified environment.

Thickness of the first transparent protective film can be properly determined and generally in the range of from about 1 to about 500 μm from the viewpoint of a strength, workability such as handlability, requirement for a thin film and the like. Such a thickness allows mechanical protection of the polarizer, prevention of shrinkage of the polarizer even upon exposure to high temperature or high pressure, and retention of stable optical properties. The thickness of the first transparent protective film is preferably from 5 to 200 μm, more preferably from 10 to 100 μm. Since the present invention aims to produce a thin polarizing plate, the first transparent protective film is preferably as thin as possible, as long as the object of protecting or reinforcing the polarizer is achieved. From this point of view, the thickness of the first transparent protective film is more preferably 80 μm or less. For the peeling-off of the surface layer of the modified polarizer, the mechanical strength is preferably as high as possible, while the tensile elongation is preferably as small as possible. From this point of view, the thickness of the first transparent protective film is more preferably 10 μm or more.

At least one selected from a cellulose resin, a polycarbonate resin, a cyclic polyolefin resin, and a (meth)acrylic resin is preferably used for the transparent protective film according to the present invention.

The cellulose resin is an ester of cellulose and a fatty acid. Examples of such a cellulose ester resin include triacetyl cellulose, diacetyl cellulose, tripropionyl cellulose, dipropionyl cellulose, and the like. In particular, triacetyl cellulose is preferred. Much commercially available triacetyl celluloses are placing on sale and are advantageous in view of easy availability and cost. Examples of commercially available products of triacetyl cellulose include UV-50, UV-80, SH-80, TD-80U, TD-TAC, and UZ-TAC (trade names) manufactured by Fujifilm Corporation, and KC series manufactured by Konica Minolta. In general, these triacetyl cellulose products have a thickness direction retardation (Rth) of about 60 nm or less, while having an in-plane retardation (Re) of almost zero.

Cellulose resin films with relatively small thickness direction retardation may be obtained by processing any of the above cellulose resins. Examples of the processing method include a method that includes laminating a general cellulose-based film to a base film such as a polyethylene terephthalate, polypropylene, or stainless steel film, coated with a solvent such as cyclopentanone or methyl ethyl ketone, drying the laminate by heating (for example, at 80 to 150° C. for 3 to 10 minutes) and then separating the base film; and a method that includes coating a general cellulose resin film with a solution of a norbornene resin, a (meth)acrylic resin or the like in a solvent such as cyclopentanone or methyl ethyl ketone, drying the coated film by heating (for example, at 80 to 150° C. for 3 to 10 minutes), and then separating the coating.

The cellulose resin film with a relatively small thickness direction retardation to be used may be a fatty acid cellulose resin film with a controlled degree of fat substitution. While triacetyl cellulose for general use has a degree of acetic acid substitution of about 2.8, preferably, the degree of acetic acid substitution is controlled to 1.8 to 2.7, so that the Rth can be reduced. The Rth may also be controlled to be low by adding a plasticizer such as dibutyl phthalate, p-toluenesulfonanilide, and acetyl triethyl citrate, to the fatty acid-substituted cellulose resin. The plasticizer is preferably added in amount of 40 parts by weight or less, more preferably of 1 to 20 parts by weight, still more preferably of 1 to 15 parts by weight, to 100 parts by weight of the fatty acid cellulose resin.

For example, the cyclic polyolefin resin is preferably a norbornene resin. Cyclic olefin resin is a generic name for resins produced by polymerization of cyclic olefin used as a polymerizable unit, and examples thereof include the resins disclosed in JP-A Nos. 01-240517, 03-14882, and 03-122137. Specific examples thereof include ring-opened (co)polymers of cyclic olefins, addition polymers of cyclic olefins, copolymers (typically random copolymers) of cyclic olefins and α-olefins such as ethylene and propylene, graft polymers produced by modification thereof with unsaturated carboxylic acids or derivatives thereof, and hydrides thereof. Examples of the cyclic olefin include norbornene monomers.

Various commercially available cyclic polyolefin resins are placing on sale. Examples thereof include Zeonex (trade name) and Zeonor (trade name) series manufactured by Zeon Corporation, Arton (trade name) series manufactured by JSR Corporation, Topas (trade name) series manufactured by Ticona, and Apel (trade name) series manufactured by Mitsui Chemicals, Inc.

The (meth)acrylic resin preferably has a glass transition temperature (Tg) of 115° C. or more, more preferably of 120° C. or more, still more preferably of 125° C. or more, particularly preferably of 130° C. or more. If the Tg is 115° C. or more, the resulting polarizing plate can have good durability. The upper limit to the Tg of the (meth)acrylic resin is preferably, but not limited to, 170° C. or less, in view of formability and the like. The (meth)acrylic resin can form a film with an in-plane retardation (Re) of almost zero and a thickness direction retardation (Rth) of almost zero.

Any appropriate (meth)acrylic resin may be used as long as the advantages of the present invention are not reduced. Examples of such a (meth)acrylic resin include poly(meth)acrylate such as poly(methyl methacrylate), methyl methacrylate-(meth)acrylic acid copolymers, methyl methacrylate-(meth)acrylate copolymers, methyl methacrylate-acrylate-(meth)acrylic acid copolymers, methyl (meth)acrylate-styrene copolymers (such as MS resins), and alicyclic hydrocarbon group-containing polymers (such as methyl methacrylate-cyclohexyl methacrylate copolymers and methyl methacrylate-norbornyl (meth)acrylate copolymers). Poly($C_{1-6}$ alkyl (meth)acrylate) such as poly(methyl (meth)acrylate) is preferred, and a methyl methacrylate-based resin mainly composed of a methyl methacrylate unit (50 to 100% by weight, preferably 70 to 100% by weight) is more preferred.

Examples of the (meth)acrylic resin include Acrypet VH and Acrypet VRL20A each manufactured by Mitsubishi Rayon Co., Ltd., (meth)acrylic resins having a ring structure in their molecule as disclosed in JP-A No. 2004-70296, and high-Tg (meth)acrylic resins produced by intramolecular crosslinking or intramolecular cyclization reaction.

Lactone ring structure-containing (meth)acrylic resins may also be used, because they have high heat resistance and high transparency and also have high mechanical strength after biaxially stretched.

Examples of the lactone ring structure-containing (meth)acrylic reins include the lactone ring structure-containing (meth)acrylic reins disclosed in JP-A Nos. 2000-230016, 2001-151814, 2002-120326, 2002-254544, and 2005-146084.

The transparent protective film to be used generally has an in-plane retardation of less than 40 nm and a thickness direction retardation of less than 80 nm. The in-plane retardation Re is expressed by the formula Re=(nx−ny)×d, the thickness direction retardation Rth is expressed by the formula Rth=(nx−nz)×d, and the Nz coefficient is represented by the formula Nz=(nx−nz)/(nx−ny), where nx, ny and nz are the refractive indices of the film in the directions of its slow axis, fast axis and thickness, respectively, d is the thickness (nm) of the film, and the direction of the slow axis is a direction in which the in-plane refractive index of the film is maximum. Moreover, it is preferable that the transparent protective film may have as little coloring as possible. A protective film having a thickness direction retardation of from −90 nm to +75 nm may be preferably used. Thus, coloring (optical coloring) of polarizing plate resulting from a protective film may mostly be cancelled using a protective film having a thickness direction retardation (Rth) of from −90 nm to +75 nm. The thickness direction retardation (Rth) is preferably from −80 nm to +60 nm, and especially preferably from −70 nm to +45 nm.

Alternatively, the transparent protective film to be used may be a retardation plate having an in-plane retardation of 40 nm or more and/or a thickness direction retardation of 80 nm or more. The in-plane retardation is generally controlled in the range of 40 to 200 nm, and the thickness direction retardation is generally controlled in the range of 80 to 300 nm. The retardation plate for use as the transparent protective film also has the function of the transparent protective film and thus can contribute to a reduction in thickness.

Examples of the retardation plate include a birefringent film produced by uniaxially or biaxially stretching a polymer material, an oriented liquid crystal polymer film, and an oriented liquid crystal polymer layer supported on a film. The thickness of the retardation plate is generally, but not limited to, from about 20 to about 150 μm.

Examples of the polymer material include polyvinyl alcohol, polyvinyl butyral, poly(methyl vinyl ether), poly(hydroxyethyl acrylate), hydroxyethyl cellulose, hydroxypropyl cellulose, methylcellulose, polycarbonate, polyarylate, polysulfone, polyethylene terephthalate, polyethylene naphthalate, polyethersulfone, polyphenylene sulfide, polyphenylene oxide, polyallylsulfone, polyamide, polyimide, polyolefin, polyvinyl chloride, cellulose resins, cyclic polyolefin resins (norbornene reins), and various types of binary or ternary copolymers thereof, graft copolymers thereof, and any blend thereof. Any of these polymer materials may be formed into an oriented product (a stretched film) by stretching or the like.

Examples of the liquid crystal polymer include various main-chain or side-chain types having a liquid crystal molecular orientation property-imparting conjugated linear atomic group (mesogen) introduced in a main or side chain of a polymer. Examples of the main chain type liquid crystal polymer include polymers having a mesogen group bonded thereto via a flexibility-imparting spacer moiety, such as nematically ordered polyester liquid-crystalline polymers, discotic polymers, and cholesteric polymers. For example, the side-chain type liquid crystal polymer may be a polymer comprising: a main chain skeleton of polysiloxane, polyacrylate, polymethacrylate, or polymalonate; and a side chain having a mesogen moiety that comprises a nematic orientation-imparting para-substituted cyclic compound unit and is bonded thereto via a spacer moiety comprising a conjugated atomic group. For example, any of these liquid crystal polymers may be applied by a process that includes spreading a solution of the liquid crystalline polymer on an alignment surface such as a rubbed surface of a thin film of polyimide, polyvinyl alcohol or the like, formed on the glass plate, and an obliquely vapor-deposited silicon oxide surface, and heat-treating it.

The retardation plate may have any appropriate retardation depending on the intended use such as compensation for coloration, viewing angle, or the like due to the birefringence of various wave plates or liquid crystal layers. Two or more types of retardation plates may also be laminated to provide controlled optical properties, including retardation.

The transparent protective film may be appropriately selected depending on the liquid crystal display to be produced therewith. In the case of VA (Vertical Alignment, including MVA and PVA), it is preferred that the transparent protective film on at least one side of the polarizing plate (on the cell side) has a retardation. Specifically, it preferably has a retardation Re in the range of 0 to 240 nm and a retardation Rth in the range of 0 to 500 nm. In terms of three-dimensional refractive index, the case of nx>ny=nz, nx>ny>nz, nx>nz>ny, or nx=ny>nz (uniaxial, biaxial, Z conversion, negative C-plate) is preferred. When polarizing plates are used on upper and lower sides of a liquid crystal cell, the transparent protective films may have a retardation on upper and lower sides of the liquid crystal cell, or one of the upper and lower transparent protective films may has a retardation.

For example, in the case of IPS (In-Plane Switching, including FFS), the transparent protective film for use in one of the polarizing plates may have or may not have a retardation. For example, a transparent protective film with no retardation is preferably provided on both upper and lower sides of a liquid crystal cell (cell sides), or otherwise a transparent protective film with a retardation is preferably provided on both or one of the upper and lower sides of a liquid crystal cell (for example, Z conversion on the upper side with no retardation on the lower side or an A-plate provided on the upper side with a positive C-plate provided on the lower side). When it has a retardation, it preferably has a retardation Re in the range of −500 to 500 nm and a retardation Rth in the range of −500 to 500 nm. In terms of three-dimensional refractive index, nx>ny=nz, nx>nz>ny, nz>nx=ny, or nz>nx>ny (uniaxial, Z conversion, positive C-plate, positive A-plate) is preferred.

The transparent protective film may be subjected to surface modification treatment for improving the adhesion to the polarizer, before it is coated with an adhesive. Examples of such treatment include corona treatment, plasma treatment, flame treatment, ozone treatment, primer treatment, glow treatment, saponification treatment, and coupling agent treatment.

A hard coat layer may be prepared, or antireflection processing, processing aiming at sticking prevention, diffusion or anti glare may be performed onto the face of the transparent protective film on which the polarizing film not been adhered.

Note that in a case where the first transparent protective films are provided on both sides of a polarizer, the protective films made from the same polymer may be used on both sides thereof or alternatively, the first transparent protective films made from polymer materials different from each other may also be used on respective both sides thereof.

The first adhesive layer for use in bonding the polarizer to the first transparent protective film in the production of the polarizing plate of the present invention may be of any type such as water-based type, solvent-based type or hot melt type, as long as it is optically transparent. The adhesive to be used may be any of various types such as cold setting adhesives and curing adhesives (hot-setting adhesives; electron beam curing adhesives, radiation curing adhesives such as ultraviolet curing adhesives; moisture curing adhesives). Considering the effect on the polarizer, cold setting or moisture curing adhesives are preferred. When a hot-setting adhesive is used, the adhesive should be set at a temperature as low as possible, preferably at a temperature of 60° C. or less. The adhesive to be used may be any of a one-part adhesive and a two-part adhesive. In view of pot life, a one-part adhesive is preferred. In order to improve the durability, a crosslinking agent may be added to the adhesive for forming the adhesive layer. The adhesive or the adhesive layer for use in an embodiment of the present invention may be a pressure-sensitive adhesive or a pressure-sensitive adhesive layer.

Examples of the adhesive include polyvinyl alcohol adhesive, gelatin adhesives, vinyl adhesives, latex adhesives, polyurethane adhesives, cyanoacrylate adhesives, acrylic adhesives, α-olefin adhesives, isocyanate adhesives, polyester adhesives, and epoxy adhesives. Any of various crosslinking agents may be added to the adhesive. The adhesive may also contain a catalyst, a coupling agent, any of various tackifiers, an ultraviolet-absorbing agent, an antioxidant, a stabilizer such as a heat-resistant stabilizer or a hydrolysis-resistant stabilizer, or the like. The adhesive for use in an embodiment of the present invention may also contain metal compound filler. The fluidity of the adhesive layer can be controlled using the metal compound filler, so that the thickness of the film can be stabilized, which makes it possible to produce a polarizing plate having a good appearance and high in-plane uniformity and no variations in adhesive properties. The solids content of the adhesive to be used is generally from 0.1 to 20% by weight.

Of these adhesives, preferred are polyvinyl alcohol adhesives, polyurethane adhesives, cyanoacrylate adhesives, acrylic adhesives, and α-olefin adhesives.

When the adhesive is a water- or solvent-based adhesive, the adhesive layer may be formed by performing a drying process after the bonding process. When the water- or solvent-based adhesive is used, the drying process may be performed at a drying temperature of about 20 to about 80° C., preferably 40 to 80° C., for a time period of about 1 to about 10 minutes, preferably 1 to 5 minutes.

When the adhesive is of a curing type, the adhesive layer may be formed by performing a curing process after the bonding process. An electron beam curing adhesive, an ultraviolet curing adhesive, and a hot-setting adhesive may be cured by electron beam irradiation, ultraviolet treatment and heat treatment, respectively. Appropriate curing conditions may be set for each curing treatment depending on the curing type, the adhesive type, and the thickness of the adhesive layer.

A primer for the adhesive may be used. Examples of such an adhesive primer include a silane coupling agent having a hydrolyzable alkoxysilyl group and a reactive functional group such as amino, vinyl, epoxy, mercapto, or chloro in the same molecule, a titanate coupling agent having an organic functional group and a titanium-containing hydrolyzable hydrophilic group in the same molecule, an aluminate coupling agent having an organic functional group and an aluminum-containing hydrolyzable hydrophilic group in the same molecule, and a resin having an organic reactive group, such as an epoxy resin, an isocyanate resin, a urethane resin, or an ester urethane resin. Of these, the silane coupling agent is preferred, because it is easy to handle industrially.

The adhesive layer formed from the water- or solvent-based adhesive preferably has a thickness of 10 to 500 nm. The thickness of the adhesive layer is more preferably from 10 to 300 nm, even more preferably from 20 to 100 nm. On the other hand, the adhesive layer formed from the curing adhesive preferably has a thickness of 0.1 to 50 µm, more preferably 0.5 to 10 µm, even more preferably 0.5 to 5 µm.

When the production method is performed on a continuous line, the line speed is preferably from 1 to 500 m/minute, more preferably from 5 to 300 m/minute, even more preferably from 10 to 100 m/minute, depending on the adhesive curing time. If the line speed is too low, the productivity may be low, or the transparent protective film may be significantly damaged so that a polarizing plate capable of passing a durability test and so on cannot be produced. If the line speed is too high, the adhesive may be insufficiently cured so that the desired adhesive properties may fail to be obtained.

A description is give below of the polarizing plate produced by the production method of the present invention. FIG. 3 is a cross-sectional view showing a polarizing plate 10a obtained by the production method according to an embodiment of the present invention. The cross-section of the polarizing plate obtained by the production method according to an embodiment of the present invention is also already shown in FIG. 2A or 2B. As shown in FIG. 3, the polarizing plate 10a according to an embodiment of the present invention includes a polarizer 1 made of a surface layer formed by peeling, a first transparent protective film 2a provided on one side of the polarizer 1 opposite to the other side formed by the peeling, and a first adhesive layer 3a interposed between the polarizer 1 and the protective film 2a.

The polarizing plate 10a obtained by the production method according to an embodiment of the present invention may further include a second transparent protective film or a transparent protective layer provided on the other side formed by the peeling, and a second adhesive layer interposed between the second transparent protective film or the transparent protective layer and the other side formed by the peeling.

FIG. 4 shows a case where a polarizing plate 10b includes the polarizing plate 10a as shown in FIG. 3, a second transparent protective film 2b provided on the side formed by the peeling (the other side of the polarizer 1), and a second adhesive layer or an adhesive layer 3b interposed therebetween. The second transparent protective film may be made of the same material and have the same thickness as the first transparent protective film. The materials of the first and second transparent protective films may be the same or different. The second adhesive layer may also have the same thickness as the first adhesive layer.

FIG. 5 shows a case where a polarizing plate 10c includes the polarizing plate 10a as shown in FIG. 3 and a transparent protective layer 2c provided on the other side formed by the peeling (the other side of the polarizer 1). The transparent protective layer may be formed by applying and curing a resin. A thermosetting resin such as a (meth)acrylic, urethane, acrylic urethane, epoxy, or silicone resin, or an active energy ray-curable resin such as an ultraviolet-curable resin may be used to form the transparent protective layer. The resin used to form the transparent protective layer also preferably has a high level of transparency, mechanical strength, thermal stability, moisture barrier properties, and isotropy. The ultraviolet-curable resin should preferably have high light resistance, because many ultraviolet-curable reins may be yellowed by strong photoirradiation. The resin may be applied by immersion in a resin solution or a liquid resin. Similarly to the thickness of the first transparent protective film, the thickness of the transparent protective layer is preferably as thin as possible, as long as the function of the protective layer is not reduced. The thickness of the transparent protective layer is preferably from 0.1 to 200 µm, more preferably from 1 to 50 µm.

The polarizing plate obtained by the production method of the present invention may further include a pressure-sensitive adhesive layer to be attached to any other component such as a liquid crystal cell. For practical use, any other optical layer may be provided on the polarizing plate with the pressure-sensitive adhesive layer interposed therebetween. A release liner may be provided on the pressure-sensitive adhesive layer. Referring to FIG. 6, a pressure-sensitive adhesive polarizing plate 20 includes the polarizing plate 10a as shown in FIG. 3, a pressure-sensitive adhesive layer 4 provided on the other side formed by the peeling (the other side of the polarizer 1), and a release liner 5 provided on the pressure-sensitive adhesive layer 4. Referring to FIG. 7, an optical film 30 includes the polarizing plate 10a as shown in FIG. 3, an optical layer 6 provided on the other side formed by the peeling (the other side of the polarizer 1), a pressure-sensitive adhesive layer 4 interposed therebetween, another pressure-sensitive adhesive layer 4, and a release liner 5 provided on the pressure-sensitive adhesive layer 4. While FIG. 6 or 7 illustrates an embodiment in which the polarizing plate 10a shown in FIG. 1 is used, the polarizing plate 10b and 10c shown in FIG. 4 or 5 may also be used in the embodiment shown in FIG. 6 or 7.

As pressure-sensitive adhesive that forms pressure-sensitive layer is not especially limited, and, for example, acrylic type polymers; silicone type polymers; polyesters, polyurethanes, polyamides, polyethers; fluorine type and rubber type polymers may be suitably selected as a base polymer. Especially, a pressure-sensitive adhesive such as acrylics type pressure-sensitive adhesives may be preferably used, which is excellent in optical transparency, showing adhesion characteristics with moderate wettability, cohesiveness and adhesive property and has outstanding weather resistance, heat resistance, etc.

Moreover, a pressure-sensitive adhesive layer with low moisture absorption and excellent heat resistance is desirable. This is because those characteristics are required in order to prevent foaming and peeling-off phenomena by moisture absorption, in order to prevent decrease in optical characteristics and curvature of a liquid crystal cell caused by thermal expansion difference etc. and in order to manufacture a liquid crystal display excellent in durability with high quality.

The pressure-sensitive adhesive layer may contain additives, for example, such as natural or synthetic resins, adhesive resins, glass fibers, glass beads, metal powder, fillers comprising other inorganic powder etc., pigments, colorants and antioxidants. Moreover, it may be a pressure-sensitive adhesive layer that contains fine particle and shows optical diffusion nature.

Proper method may be carried out to attach a pressure-sensitive adhesive layer to one side or both sides of a polarizing plate or an optical film. As an example, about 10 to about 40 weight % of the pressure-sensitive adhesive solution in which a base polymer or its composition is dissolved or dispersed, for example, toluene or ethyl acetate or a mixed solvent of these two solvents is prepared. A method in which this solution is directly applied on a polarizing plate top or an optical film top using suitable developing methods, such as cast method and coating method, or a method in which a pressure-sensitive adhesive layer is once formed on a separator (release liner), as mentioned above, and is then transferred on a polarizing plate or an optical film may be mentioned.

The thickness of the pressure-sensitive adhesive layer is typically, but not limited to, from about 1 to about 35 µm, preferably from 2 to 25 µm. The separator (release liner) may be subjected to treatment with a release agent, as needed.

As the optical layers, one layer or two layers or more of optical layers, which may be used for formation of a liquid crystal display etc., such as a retardation plate (a half wavelength plate and a quarter wavelength plate included), which is described in the first transparent protective film, a reflector, a viewing angle compensation film and a brightness enhancement film may be used.

Although an optical film with the above described optical layer laminated to the polarizing plate may be formed by a method in which laminating is separately carried out sequentially in manufacturing process of a liquid crystal display etc., an optical film in a form of being laminated beforehand has an outstanding advantage that it has excellent stability in quality and assembly workability, etc., and thus manufacturing processes ability of a liquid crystal display etc. may be raised. Proper adhesion means, such as an adhesive layer, may be used for laminating. On the occasion of adhesion of the above described polarizing plate and other optical films, the optical axis may be set as a suitable configuration angle according to the target retardation characteristics etc.

A polarizing plate or an optical film of the present invention may be preferably used for manufacturing various equipment, such as liquid crystal display, etc. Assembling of a liquid crystal display may be carried out according to conventional methods. That is, a liquid crystal display is generally manufactured by suitably assembling several parts such as a liquid crystal cell, polarizing plates or optical films and, if necessary, lighting system, and by incorporating driving circuit. In the present invention, except that a polarizing plate or an optical film by the present invention is used, there is especially no limitation to use any conventional methods. Also any liquid crystal cell of arbitrary type, such as TN type, and STN type, π type, VA type, IPS type may be used.

Suitable liquid crystal displays, such as liquid crystal display with which the above-mentioned polarizing plate or optical film has been located at one side or both sides of the liquid crystal cell, and with which a backlight or a reflector is used for a lighting system may be manufactured. In this case, the polarizing plate or optical film by the present invention may be installed in one side or both sides of the liquid crystal cell. When installing the polarizing plate or optical films in both sides, they may be of the same type or of different type. Furthermore, in assembling a liquid crystal display, suitable parts, such as diffusion plate, anti-glare layer, antireflection film, protective plate, prism array, lens array sheet, optical diffusion plate, and backlight, may be installed in suitable position in one layer or two or more layers.

EXAMPLES

Some examples of the present invention are described below, which are not intended to limit the embodiments of the present invention.

Production Example

Production of Polarizer

A raw polyvinyl alcohol film (VF-PS (trade name) 75 μm in thickness, manufactured by Kuraray Co., Ltd.) was used. The raw film was fed to a continuous stretching machine and subjected to the respective processes described below in the order shown below.

(Swelling Process)

Pure water adjusted to 30° C. was used as a treatment liquid for the swelling bath. The polyvinyl alcohol film was fed to the swelling bath, immersed in the pure water, and uniaxially stretched to 1.5 times in the longitudinal direction of the film (the MD direction), while it was allowed to swell.

(Dyeing Process)

An iodine dyeing solution containing water, potassium iodide and iodine in a weight ratio of 280:7:1 and adjusted to 30° C. was used as a treatment liquid for the dyeing bath. The swelling polyvinyl alcohol film was fed to the dyeing bath, immersed therein and dyed, while it was uniaxially stretched in the MD direction to a stretch ratio of 2.20 times with respect to the original length.

(Crosslinking Process)

An aqueous boric acid solution containing 3% by weight of boric acid and 3% by weight of potassium iodide and adjusted to 60° C. was used as a treatment liquid for the crosslinking bath. The dyed polyvinyl alcohol film was fed to the crosslinking bath and immersed therein, while it was uniaxially stretched in the MD direction to a stretch ratio of 3.30 times with respect to the original length.

(Stretching Process)

An aqueous boric acid solution containing 4% by weight of boric acid and 5% by weight of potassium iodide and adjusted to 60° C. was used as a treatment liquid for the stretching bath. The crosslinked polyvinyl alcohol film was fed to the stretching bath and immersed therein, while it was uniaxially stretched to a total stretch ratio of 5.80 times with respect to the original length.

(Washing Process/Drying Process)

An aqueous solution containing 3% by weight of potassium iodide and adjusted to 30° C. was used as a treatment liquid for the washing bath. The stretched polyvinyl alcohol film was fed to the washing bath and immersed therein. The treated polyvinyl alcohol film was then dried at 60° C. to give a polarizer (25 μm in thickness).

Example 1

Surface Treatment Step (A)

One side of the polarizer obtained in the production example was irradiated with vacuum ultraviolet rays with a center wavelength of 172 nm (30 nm in half-value width) at an intensity of 10 mW/cm² for 60 seconds using an excimer lamp UER20H-172B manufactured by Ushio Inc. In this process, the lamp house was purged with nitrogen.

Bonding Step (B)

One side of the surface-treated polarizer was bonded to a transparent protective film (TAC Film KC4UK 40 μm in thickness, manufactured by Konica Minolta Opto, Inc.) with a polyurethane adhesive (NM89-50G (a moisture-curing, one-part, solvent-based adhesive) manufactured by Mitsui Chemicals Polyurethane Inc.) In the bonding step, the adhesive was applied to the transparent protective film so as to provide a post-drying thickness of 3 μm, and then the polarizer was attached thereto. Thereafter, they are bonded together using a roll machine. The laminate was then dried at 60° C. for 10 minutes so that a temporary polarizing plate having the surface-treated polarizer and the transparent protective film bonded to one side of the polarizer was obtained.

Peeling Step (C)

The polarizer side of the temporary polarizing plate was bonded to a stainless steel plate with the same adhesive as used in the bonding step (B), and then the transparent protective film was peeled off from the temporary polarizing plate by 180° peeling. As a result, a polarizing plate having the transparent protective film and an about 2 μm-thick polarizer surface layer bonded to one side of the protective film with a 3 μm-thick adhesive layer interposed therebetween was obtained. The polarizing plate had a thickness of 45 μm. FIG. 8 shows a cross-sectional scanning electron micrograph of the polarizer part of the resulting polarizing plate. FIG. 8 shows that the thicknesses of the adhesive layer and the polarizer layer are 2.8 μm and 2 μm, respectively.

The same transparent protective film as used in the bonding step (B) was bonded to the polarizer side of the resulting polarizing plate (the side to which no transparent protective film was bonded) with the same adhesive as used in the bonding step (B) by the same method, so that a polarizing plate having the polarizer and the transparent protective films bonded to both sides of the polarizer was obtained. The polarizing plate had a thickness of 88 μm.

Example 2

A polarizing plate having a transparent protective film bonded to one side and a polarizing plate having transparent protective films bonded to both sides were prepared using the process of Example 1, except that the vacuum ultraviolet irradiation time was changed to 30 seconds in the surface treatment step (A). The polarizing plate having the transparent protective film bonded to one side had a thickness of 45 μm, and the polarizing plate having the transparent protective films bonded to both sides had a thickness of 88 μm.

Example 3

Example 2

A polarizing plate having a transparent protective film bonded to one side and a polarizing plate having transparent protective films bonded to both sides were prepared using the process of Example 1, except that the vacuum ultraviolet irradiation time was changed to 5 seconds in the surface treatment step (A). The polarizing plate having the transparent protective film bonded to one side had a thickness of 45 μm, and the polarizing plate having the transparent protective films bonded to both sides had a thickness of 88 μm.

Example 4

Example 2

A polarizing plate having a transparent protective film bonded to one side and a polarizing plate having transparent protective films bonded to both sides were prepared using the process of Example 1, except that the vacuum ultraviolet irradiation time was changed to 200 seconds in the surface treatment step (A). The polarizing plate having the transparent protective film bonded to one side had a thickness of 45 µm, and the polarizing plate having the transparent protective films bonded to both sides had a thickness of 88 µm.

Example 5

Surface Treatment Step (A)

One side of the polarizer obtained in the production example was irradiated with vacuum ultraviolet rays with a center wavelength of 126 nm (30 nm in half-value width) at an intensity of 7.5 mW/cm$^2$ for 60 seconds using an excimer lamp UER20H-126VB manufactured by Ushio Inc. In this process, the lamp house was purged with nitrogen.

A polarizing plate having a transparent protective film bonded to one side and a polarizing plate having transparent protective films bonded to both sides were prepared using the bonding step (B) and the later steps of Example 1, except that the resulting surface-treated polarizer was used. The polarizing plate having the transparent protective film bonded to one side had a thickness of 45 µm, and the polarizing plate having the transparent protective films bonded to both sides had a thickness of 88 µm.

Example 4

Surface Treatment Step (A)

Both sides of the polarizer obtained in the production example was irradiated with vacuum ultraviolet rays with a center wavelength of 172 nm (30 nm in half-value width) at an intensity of 10 mW/cm$^2$ for 60 seconds using an excimer lamp UER20H-172B manufactured by Ushio Inc. In this process, the lamp house was purged with nitrogen.

Bonding Step (B)

The same transparent protective films as used in Example 1 were bonded to both sides of the resulting surface-treated polarizer with the same adhesive by the same method, so that a temporary polarizing plate having the polarizer and the transparent protective films bonded to both sides of the polarizer was obtained.

Peeling Step (C)

One of the transparent protective films was peeled off from one side of the temporary polarizing plate by 180° peeling. The other transparent protective film was then peeled off by 180° peeling. As a result, a polarizing plate having the transparent protective film and an about 2 µm-thick polarizer surface layer bonded to one side of the protective film with a 3 µm-thick adhesive layer interposed therebetween was obtained in each case. The thickness of each polarizing plate was 45 µm.

The same transparent protective film as used in the bonding step (B) was bonded to the polarizer side of the resulting polarizing plate (the side to which no transparent protective film was bonded) with the same adhesive as used in the bonding step (B) by the same method, so that a polarizing plate having the polarizer and the transparent protective films bonded to both sides of the polarizer was obtained. The polarizing plate had a thickness of 88 µm.

Comparative Example 1

The polarizer obtained in the production example was subjected to the bonding step (B) of Example 1 without the surface treatment step (A), so that a polarizing plate having the polarizer and the transparent protective film bonded to one side of the polarizer was obtained. The polarizing plate was subjected to the peeling step (C) in the same manner as in Example 1, but it was impossible to peel off the transparent protective film.

Then, the same transparent protective film as used in the bonding step (B) in Example 1 was bonded to the polarizer side of the resulting polarizing plate (the side to which no transparent protective film was bonded) with the same adhesive as used in the bonding step (B) in Example 1 by the same method, so that a polarizing plate having the polarizer and the transparent protective films bonded to both sides of the polarizer was obtained. The polarizing plate had a thickness of 111 µm.

Comparative Example 2

Surface Treatment Step (A')

Both sides of the polarizer obtained in the production example was irradiated with vacuum ultraviolet rays with a center wavelength of 222 nm (8 nm in half-value width) at an intensity of 8.5 mW/cm$^2$ for 60 seconds using an excimer lamp UER20H-222B manufactured by Ushio Inc. In this process, the lamp house was purged with nitrogen.

Bonding Step (B)

The same transparent protective films as used in Example 1 were bonded to both sides of the resulting surface-treated polarizer with the same adhesive by the same method, so that a temporary polarizing plate having the polarizer and the transparent protective films bonded to both sides of the polarizer was obtained.

Peeling Step (C)

It was attempted to peel off the transparent protective film in the same manner as in Example 1 from the temporary polarizing plate with the polarizer side bonded to the stainless steel plate. However, the transparent protective film was ruptured, and the peeling was impossible.

Then, the same transparent protective film as used in the bonding step (B) in Example 1 was bonded to the polarizer side of the resulting polarizing plate (the side to which no transparent protective film was bonded) with the same adhesive as used in the bonding step (B) in Example 1 by the same method, so that a polarizing plate having the polarizer and the transparent protective films bonded to both sides of the polarizer was obtained. The polarizing plate had a thickness of 111 µm.

Comparative Example 3

The process of Example 1 was performed, except that the surface treatment step (A') of Comparative Example 2 was performed with a modified vacuum ultraviolet irradiation time of 200 seconds. However, the transparent protective film was ruptured in the peeling step (C), and the peeling was impossible similarly to Comparative Example 2.

Then, the same transparent protective film as used in the bonding step (B) in Example 1 was bonded to the polarizer side of the resulting polarizing plate (the side to which no transparent protective film was bonded) with the same adhesive as used in the bonding step (B) in Example 1 by the same method, so that a polarizing plate having the polarizer and the transparent protective films bonded to both sides of the polarizer was obtained. The polarizing plate had a thickness of 111 μm.

Comparative Example 4

Surface Treatment Step (A')

Both sides of the polarizer obtained in the production example was irradiated with ultraviolet light at an intensity of 40 mW/cm$^2$ for 30 seconds using a high-pressure mercury lamp (metal halide lamp) manufactured by EYE GRAPHICS Co., Ltd. In this process, the lamp house was purged with nitrogen.

Bonding Step (B)

The same transparent protective films as used in Example 1 were bonded to both sides of the resulting surface-treated polarizer with the same adhesive by the same method, so that a temporary polarizing plate having the polarizer and the transparent protective films bonded to both sides of the polarizer was obtained.

Peeling Step (C)

It was attempted to peel off the transparent protective film in the same manner as in Example 1 from the temporary polarizing plate with the polarizer side bonded to the stainless steel plate. However, the transparent protective film was ruptured, and the peeling was impossible.

Then, the same transparent protective film as used in the bonding step (B) in Example 1 was bonded to the polarizer side of the resulting polarizing plate (the side to which no transparent protective film was bonded) with the same adhesive as used in the bonding step (B) in Example 1 by the same method, so that a polarizing plate having the polarizer and the transparent protective films bonded to both sides of the polarizer was obtained. The polarizing plate had a thickness of 111 μm.

[Evaluation]

The polarizing plates obtained in the examples and the comparative examples were evaluated as described below. The results are shown in Table 1. Table 1 also shows the conditions of the production of the polarizing plate of each example and the thickness of the resulting polarizing plate.

<Curling>

The resulting polarizing plate was cut into a 200 mm×100 mm piece having the absorption axis of the polarizer in the longitudinal direction. The cut piece (the transparent protective film side of the polarizing plate in the case that the transparent protective film was provided only on one side) was attached to one side of a 210 mm-long, 110 mm-wide, 0.7 mm-thick glass plate with an acrylic pressure-sensitive adhesive interposed therebetween, so that a polarizing plate-carrying glass plate was formed as a sample. The sample was stored in a heating and humidifying environment at 60° C. and 90% RH for 24 hours and then measured for the amount of curling. As shown in FIG. 9, the sample curled away from the glass surface toward the slow axis side of the polarizer. In the measurement of the amount of curling, the sample was placed on a horizontal surface plate T in such a manner that the polarizing plate 10 faced upward, and the distance (d (mm)) from the surface plate to the most curling one of the four corners of the glass plate G was measured. A clearance gauge was used to measure the samples of the examples. In the samples of the comparative examples, however, curling was too large to be measured with a clearance gauge, and therefore a vernier caliper was used in the measurement.

TABLE 1

| | | Ultraviolet irradiation conditions | | | | Possibility or impossibility | Polarizing plate having transparent protective film | | Polarizing plate having transparent protective films | |
| | | Center | | | | of peeling-off | on one side | | on both sides | |
| Example 1 | Lamp type | wavelength (nm) | Half-value width (nm) | Intensity (mW/cm$^2$) | Irradiation time (s) | of polarizer surface layer | Thickness (μm) | Curling (mm) | Thickness (μm) | Curling (mm) |
| --- | --- | --- | --- | --- | --- | --- | --- | --- | --- | --- |
| Example 1 | Excimer (Xe$_2$) | 172 | 30 | 10 | 60 | ○ | 45 | 0.1 | 88 | 0.2 |
| Example 2 | Excimer (Xe$_2$) | 172 | 30 | 10 | 30 | ○ | 45 | 0.1 | 88 | 0.25 |
| Example 3 | Excimer (Xe$_2$) | 172 | 30 | 10 | 5 | ○ | 45 | 0.1 | 88 | 0.2 |
| Example 4 | Excimer (Xe$_2$) | 172 | 30 | 10 | 200 | ○ | 45 | 0.1 | 88 | 0.2 |
| Example 5 | Excimer (Ar$_2$) | 126 | 30 | 7.5 | 60 | ○ | 45 | 0.1 | 88 | 0.2 |
| Example 6 | Excimer (Xe$_2$) | 172 | 30 | 10 | 60 × 2 | ○ | 45 | 0.1 | 88 | 0.25 |
| Comparative Example 1 | Absent | — | — | — | — | × | — | — | 111 | 3 |
| Comparative Example 2 | Excimer (KrCl) | 222 | 8 | 8.5 | 60 | × | — | — | 111 | 2.5 |
| Comparative Example 3 | Excimer (KrCl) | 222 | 8 | 8.5 | 200 | × | — | — | 111 | 3 |
| Comparative Example 4 | Metal halide | — | — | 40 | 30 | × | — | — | 111 | 3 |

Table 1 shows that according to the examples, a thin polarizing plate having an about 2 μm-thick polarizer has been obtained, and therefore, the thickness of such a polarizing plate has been reduced as compared with a conventional polarizing plate (the comparative example) having transparent protective films each with the same thickness on both sides. It is also apparent that the amount of curling after the heat and humidity test is relatively small in the examples. This suggests that in the polarizing plate of the present invention, the contractile force in the absorption axis direction should be significantly reduced even in the heating and humidifying environment.

There was almost no difference between the optical properties (single-piece transmittance and degree of polarization) of the examples and the comparative examples, and the display characteristics were good, when they were each attached to an LCD. The single-piece transmittance (T) was measured using an ultraviolet-visible spectrophotometer (V7100/VAP-7070 (trade name) manufactured by JASCO Corporation). The degree of polarization (P) was determined using the ultraviolet-visible spectrophotometer from the transmittance (parallel transmittance ($H_0$)) of a laminate of polarizers with their transmission axes arranged parallel to each other and the transmittance (crossed transmittance ($H_{90}$)) of a laminate of polarizers with their transmission axes arranged perpendicular to each other according to the following formula: Degree of polarization (%)=$\{(H_0-H_{90})/(H_0+H_{90})\}^{1/2} \times 100$.

Each transmittance was determined by measuring a Y value which underwent luminosity correction in the two-degree visual field (C illuminant) according to JIS Z 8701-1982.

What is claimed is:

1. A method for producing a polarizing plate comprising a polarizer and a transparent protective film provided on one side of the polarizer with an adhesive layer interposed therebetween, comprising the steps of:
   (A) irradiating at least one side of a polarizer with vacuum ultraviolet rays to treat a surface of the polarizer;
   (B) bonding a first transparent protective film to the side of the polarizer, which has been subjected to the surface treatment step (A), with a first adhesive layer interposed therebetween to produce a temporary polarizing plate; and
   (C) peeling off the first transparent protective film and a surface layer of the polarizer, which has been subjected to the surface treatment, from the temporary polarizing plate.

2. The method for producing a polarizing plate according to claim 1, wherein the polarizer is a product produced by subjecting a hydrophilic polymer film to at least a dyeing process with a dichroic material and a stretching process.

3. The method for producing a polarizing plate according to claim 2, wherein the hydrophilic polymer film is a polyvinyl alcohol film and the dichroic material is iodine.

4. The method for producing a polarizing plate according to claim 2, wherein the polarizer is a product produced by further subjecting the hydrophilic polymer film to at least one selected from a swelling process and a crosslinking process.

5. The method for producing a polarizing plate according to claim 1, wherein, a light source used for the vacuum ultraviolet irradiation in the surface treatment step (A) has intensity such that it has a half-value width of 50 nm or less at a center wavelength.

6. The method for producing a polarizing plate according to claim 1, wherein an excimer lamp, an excimer laser or a free electron laser is used as a light source for the vacuum ultraviolet irradiation in the surface treatment step (A).

7. The method for producing a polarizing plate according to claim 1, wherein both sides of the polarizer are sequentially or simultaneously subjected to the surface treatment step (A) to the peeling step (C).

* * * * *